(12) United States Patent
Hunsinger et al.

(10) Patent No.: US 8,210,112 B2
(45) Date of Patent: Jul. 3, 2012

(54) METHOD FOR IMPROVING THE SLAG QUALITY OF GRATE FIRING SYSTEMS

(75) Inventors: Hans Hunsinger, Weingarten (DE); Andreas Gerig, Karlsruhe (DE); Gerhard Haefele, Gondelsheim (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 844 days.

(21) Appl. No.: 12/308,017

(22) PCT Filed: May 24, 2007

(86) PCT No.: PCT/EP2007/004607
§ 371 (c)(1),
(2), (4) Date: Dec. 5, 2008

(87) PCT Pub. No.: WO2007/140885
PCT Pub. Date: Dec. 13, 2007

(65) Prior Publication Data
US 2009/0301364 A1   Dec. 10, 2009

(30) Foreign Application Priority Data
Jun. 7, 2006  (EP) .......................... 10 2006 026 434

(51) Int. Cl.
*F23G 5/38* (2006.01)
*F23K 3/08* (2006.01)
*F23H 7/14* (2006.01)

(52) U.S. Cl. ........ 110/346; 110/109; 110/225; 110/248; 110/255; 110/281; 110/291; 110/328; 126/175

(58) Field of Classification Search .................. 110/109, 110/225, 248, 249, 255, 257, 268, 278, 281, 110/291, 328, 165 R, 346; 126/174, 175
See application file for complete search history.

(56) References Cited

U.S. PATENT DOCUMENTS

| 3,333,556 A | 8/1967 | Iacobovici |
| 3,334,599 A | 8/1967 | Tanner |

(Continued)

FOREIGN PATENT DOCUMENTS

CH   417833 A   7/1966

(Continued)

OTHER PUBLICATIONS

International Search Report PCT EP20007/004607, dated Aug. 16, 2007.

*Primary Examiner* — Kenneth Rinehart
*Assistant Examiner* — David J Laux
(74) *Attorney, Agent, or Firm* — Leydig, Voit & Mayer, Ltd.

(57) ABSTRACT

A method for improving a slag quality of slag in a grate firing system. The method includes providing slag in a grate firing system including a combustion chamber disposed above a combustion bed. The combustion bed has a plurality of fixed-bed burnout zones in series on a combustion grate. The fixed-bed burnout zones include a first series of fixed-bed burnout zones and a second fixed bed burn-out zone disposed downstream of the first series. The first series of fixed-bed burnout zones is traversed with a flow of oxygen-containing gas. A portion of the combustion bed associated with the second fixed bed burn-out zone is traversed with a flow of a hot combustion gas from the combustion chamber.

17 Claims, 4 Drawing Sheets

U.S. PATENT DOCUMENTS

| | | | | |
|---|---|---|---|---|
| 3,799,077 | A * | 3/1974 | Lowe | 110/193 |
| 4,510,873 | A * | 4/1985 | Shigaki | 110/289 |
| 4,512,266 | A * | 4/1985 | Shigaki | 110/204 |
| 4,949,653 | A * | 8/1990 | Rast | 110/235 |
| 5,241,916 | A * | 9/1993 | Martin | 110/348 |
| 6,655,304 | B1 * | 12/2003 | Barlow | 110/347 |
| 6,796,251 | B2 * | 9/2004 | Martin et al. | 110/344 |
| 2003/0183138 | A1 | 10/2003 | Martin | |

FOREIGN PATENT DOCUMENTS

| | | |
|---|---|---|
| DE | 1451505 A | 2/1969 |
| DE | 3915992 A1 | 11/1989 |
| DE | 4402172 | 7/1995 |
| DE | 19728545 | 1/1999 |
| DE | 19961384 | 6/2001 |
| DE | 10213788 | 10/2003 |
| DE | 102004050098 | 4/2006 |
| EP | 0498014 A1 | 8/1992 |
| EP | 0941777 | 9/1999 |
| EP | 1197706 A2 | 4/2002 |
| JP | 1286943 | 11/1989 |
| WO | WO 9317280 A1 | 9/1993 |
| WO | 0003179 | 1/2000 |
| WO | WO 0165178 A1 | 9/2001 |

* cited by examiner

METHOD FOR IMPROVING THE SLAG QUALITY OF GRATE FIRING SYSTEMS

CROSS REFERENCE TO PRIOR APPLICATIONS

This is a U.S. National Phase application under 35 U.S.C. §371 of International Application No. PCT/EP2007/004607, filed on May 24, 2007, and claims the benefit of German Patent Application No. 10 2006 026 434.7, filed on Jun. 7, 2006. The International Application was published in German on Dec. 13, 2007 as WO 2007/140885 A1 under PCT Article 221(2).

1. Field

The present invention relates to a method for improving the slag quality of grate firing systems, such as of waste incineration plants, including a combustion bed, a combustion grate, and fixed-bed burnout zones.

2. Background

In an idealized consideration, the burning of solid fuels, such as of waste, biomass or coal, on combustion grates can be broken down into the sequential subprocesses of drying, degassing of the volatile constituents, burning of the residual carbon, as well as sintering of the grate ash. However, in actual grate firing systems, the fuel mixing process is very inefficient, particularly when working with pusher-type grates, resulting in an overlapping of the subprocesses over the length of the grate.

The combustible fuel component is predominantly concentrated in the volatile constituents which are released following the drying process. Depending on the locally available oxygen, these high colorific-value gases, which are released during degassing, partially burn, predominantly above the combustion bed, resulting in a significant increase in the local waste gas temperature. The fixed carbon remaining in the combustion bed accounts for only a small proportion of the entire carbon inventory, but takes substantially longer to burn out. For that reason, the grate area required to burn off the residual carbon is disproportionately large. Increasing the burn-off rate of the fixed carbon by increasing the temperature in the area of the slag burn-out zone generally makes it possible to not only improve the slag quality, but also to increase the fuel throughput. Both effects are very consequential in terms of economics.

Typically, the slag is used in the form of broken granulate for construction aggregate. Therefore, when improving the slag quality, it is generally the aim to achieve a complete as possible carbon burnout, sintering and/or melting of the incineration residues, either in a thermal aftertreatment that takes place still in the combustion bed or downstream of the combustion, or also to achieve a low pollutant content (for example, PCDD/F).

DE 199 61 384 A1 describes a method for thermally treating grate ash from garbage incineration plants, where, following the combustion, the grate ash is fed into a rotating cylinder and is thermally treated therein by another combustion fuel under oxygen supply.

DE 102 13 788 A1 describes a method for influencing incineration residues from a waste incineration plant that does not provide a downstream process step in a separate device. In this method, the process of sintering and/or melting the slag takes place still in the combustion bed of the main incineration zone, the unsintered or molten incineration residues being recycled to the incineration process after passing through the combustion bed.

However, each additional process step, even when it involves the recycling of components or an additional process chamber, signifies a considerable outlay, which is directly considered when computing the economic efficiency of an incineration plant. This is especially true of a supplementary slag treatment that requires an additional expensive oxygen enrichment of >21 % by volume. However, high temperatures are a prerequisite for slag optimization. It may be that enriching the oxygen of the combustion air results in high temperature levels, but essentially only in the gas space above the fixed-bed burnout zone and not within the entire combustion bed, which is decisive for the quality of the slag.

SUMMARY

Against this background, an aspect of the present invention is to provide a simple and reliably controllable method for improving the slag quality obtained in waste incineration processes, for example grate firings, which makes it possible to achieve a good slag quality already during the fixed-bed combustion on the grate. It is an additional, alternative, aspect of the invention to provide a method that does not produce other pollutants, such as $NO_X$, for example, and/or result in any significant reduction in the energy utilization of the heat content of the combustion waste gases.

In an embodiment, the present invention provides a for method for improving a slag quality of slag in a grate firing system. The method includes providing slag in a grate firing system including a combustion chamber disposed above a combustion bed. The combustion bed has a plurality of fixed-bed burnout zones in series on a combustion grate. The fixed-bed burnout zones include a first series of fixed-bed burnout zones and a second fixed bed burn-out zone disposed downstream of the first series. The first series of fixed-bed burnout zones is traversed with a flow of oxygen-containing gas. A portion of the combustion bed associated with the second fixed bed burn-out zone is traversed with a flow of a hot combustion gas from the combustion chamber.

BRIEF DESCRIPTION OF THE DRAWINGS

The present invention will be described in greater detail on the basis of exemplary embodiments with reference to the figures in which.

DETAILED DESCRIPTION

In an embodiment, the invention provides for an incineration process which makes use of a combustion bed having a plurality of series-configured, fixed-bed burnout zones (also known as combustion bed zones, combustion bed regions, grate regions or grate zones), which are traversed in succession by the flow of a fuel to be combusted during the incineration process. These combustion processes are typically two-step processes, i.e., an inflow of an oxygen-containing primary gas is supplied to the fixed-bed burnout zone for combustion, and a likewise oxygen-containing secondary gas is fed to the waste-gas burnout zone downstream of the fixed-bed burnout zone, for the post-combustion of the fuel-rich waste gases produced during the process of burning out the solid matter One feature of the approach for achieving the aspect provides for the targeted heating of the combustion bed (i.e., of the solid fuel, together with the possibly already formed slag and ash) on the combustion grate in the area of at least one fixed-bed burnout zone by recycling combustion gases from the combustion chamber via at least one of these fixed-bed burnout zones. Hot combustion-gas partial flows are branched off directly from the combustion chamber via at least one fixed-bed burnout zone and directed through the combustion bed of at least one downstream, preferably the last fixed-bed burnout zone. In this context, the high temperature of the combustion gas induced by a combustion in the combustion chamber can be advantageously utilized for an additional temperature increase in the combustion bed in the aforementioned downstream, i.e., preferably in at least one of the last fixed-bed burnout zones.

As mentioned at the outset, during one combustion process on a grate firing system, a fuel passes through all fixed-bed burnout zones in succession, when passing through the front (first) fixed-bed burnout zones, the burnable components of the fuel being burned off to an increasing degree, ash and slag constituents being formed in the process. These slag constituents then accumulate in these subsequent, preferably last fixed-bed burnout zones, in general, a low temperature level setting therein due to the largely already effected burnout of the solid matter and due to the cold primary gas that has been fed to this grate zone. The aforementioned deflection of hot combustion gas out of the aforementioned combustion through the subsequent, preferably one of the last, fixed-bed burnout zones, causes the slag constituents to be selectively heated there, a sintering being thereby made possible to form a slag of improved quality. Thus, the slag exits the fixed-bed burnout zone already as a sintered end product of an improved quality. Thermal aftertreatments are no longer absolutely essential. The need is also eliminated for supplying an inflow of expensive oxygen for sintering the slag.

Figure 1:
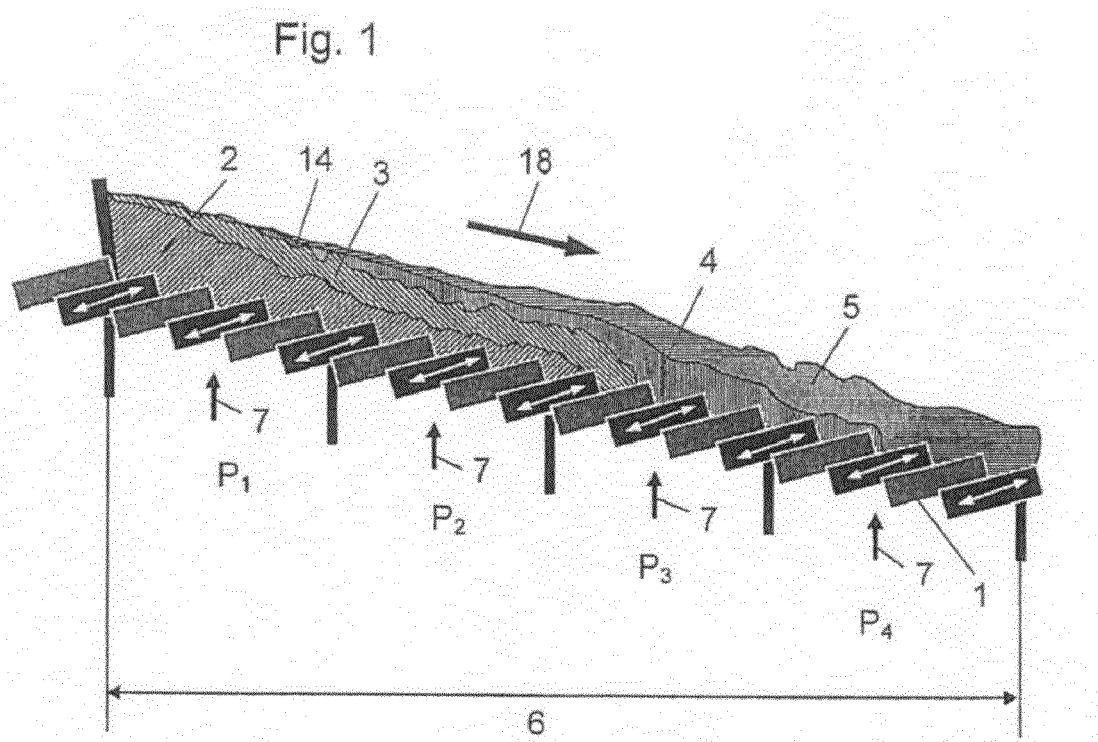
FIG. 1: shows a schematic representation of a combustion bed of a prior art grate-firing system having four fixed-bed burnout zones, by way of example.

The combustion bed of a conventional grate-firing system, as is illustrated in FIG. 1, includes a combustion grate 1 having four fixed-bed burnout zones $P_1$ through $P_4$, which are passed through in succession by a solid fuel (combustion bed 14) during a combustion. In an idealized consideration, the burnoff of the solid fuel on the combustion grate passes through the following subprocesses: drying 2, degassing 3 of the volatile waste components, burning off 4 of the residual carbon, and sintering of grate ash 5. In actual systems, the mixing process is very inefficient, particularly when working with pusher-type grates. As a result, these subprocesses overlap over length 6 of the grate. The burning off of the solid matter essentially takes place from the combustion bed surface in the direction of the combustion grate. This characteristic results in a distinct vertical temperature profile over the thickness of the combustion bed. Typically, during a combustion, an oxygen-containing primary-gas supply 7 is effected from below through all fixed-bed burnout zones of combustion grate 1.

The combustible component of the solid fuel is predominantly concentrated in the volatile constituents which are released during degassing 3 following drying process 2. Depending on the oxygen that is made available locally via the primary gas supply, these high colorific-value gases, which are released during degassing, partially burn, predominantly above the combustion bed, thereby significantly increasing the local waste gas temperature.

The fixed carbon remaining in the combustion bed following degasification, which is commonly referred to as residual carbon, accounts for only a very small proportion of the entire carbon inventory, but takes substantially longer to burn out. For that reason, the combustion grate area required for burning off the residual carbon is disproportionately large. By increasing the burn-off rate of the fixed carbon by increasing the temperature, it is generally possible to not only improve the slag quality (low Cl, TOC and PCDD/F concentrations), but also to enhance the fuel throughput.

The kinetics of the residual carbon combustion is dependent on the local temperature in the combustion bed and on the oxygen content in the last fixed-bed burnout zone. This is manifested by the difference between the position of the temperature maxima in the combustion grate and the temperature profile in the waste gas above the combustion bed.

Figure 2:
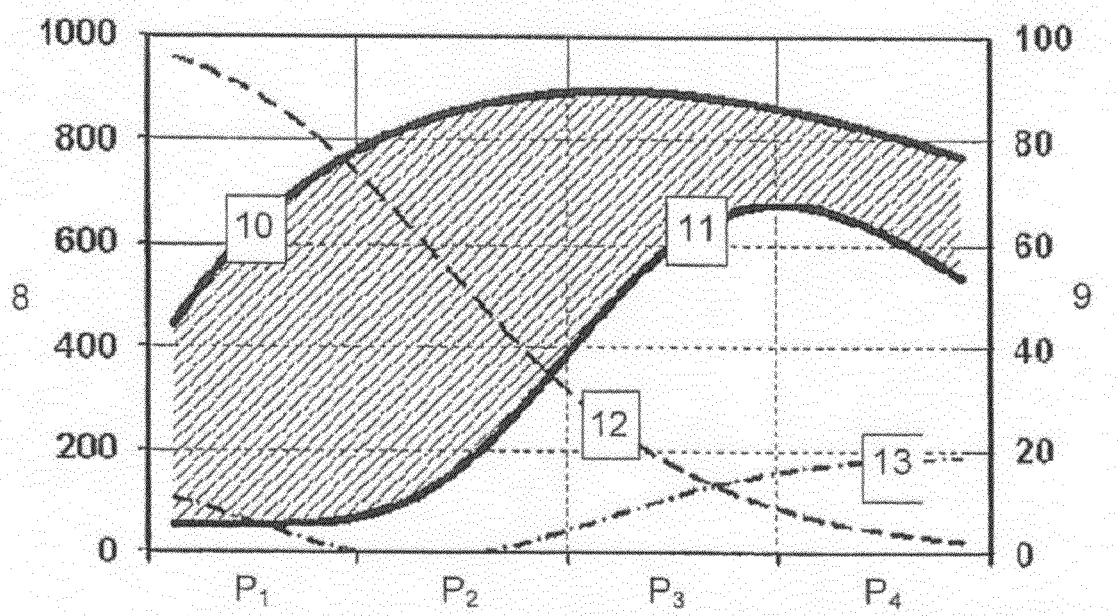
FIG. 2: shows various typical axial temperature curves measured in a refuse incineration plant (TAMARA), as well as the oxygen concentration above the combustion bed, and the carbon burnoff, plotted over the fixed-bed burnout zones in accordance with FIG. 1.

FIG. 2 shows typical axial temperature curves 8 in ° C. measured in a refuse incineration plant (TAMARA at [Research Center] Forschungszentrum Karlsruhe), as well as ascertained concentrations 9 in % for carbon burnoff 12 of the combustion bed, as well as in % by volume for oxygen concentration 13 above the combustion bed, plotted over the four fixed-bed burnout zones $P_1$ through $P_4$ of a combustion chamber. The solid fuel that is incinerated in the process is composed of 29% water, 39% volatile constituents, 5% residual carbon and 27% ash and thus represents a typical composition of household consumer waste. Between the temperature curves above combustion bed 10 and directly at grate surface 11 (thermoelements measure the lower boundary of the fuel, respectively of the ash layer), a quite considerable temperature gradient is apparent between the values. A high waste gas temperature is already apparent, particularly in the first two fixed-bed burnout zones Pi and $P_2$, while the temperature in the combustion bed is still kept low due to initial drying 2 and degassing 3 of the solid fuel. It should be considered in this context that the fuel and slag on the combustion grate exhibit only a very low thermal conductivity, and, particularly in the case of pusher-type grates (compare FIG. 1), are only insufficiently vertically mixed over the thickness of the fuel layer (combustion bed thickness) (compare FIG. 1). The heat radiating from the combustion chamber onto the fuel (combustion bed) acts only on the top layer of the combustion bed, so that it is available to only a very limited extent for a sintering over the entire thickness of the slag layer on the combustion grate for the purpose of optimizing the same.

In addition, FIG. 2 shows the burnoff curve of the entire carbon content 12 in the combustion bed, as well as oxygen concentration 13 above the combustion bed. The main combustion zone (fixed-bed burnout zone $P_2$) is characterized by a high local carbon burnoff rate, and thus also by a substantial oxygen consumption, as is evident in the $O_2$ minimum of oxygen concentration 13. In this case, the high colorific-value volatile constituents are released to such a significant degree that the oxygen, which is locally provided by the primary air, is insufficient for ensuring a complete oxidation directly in and above the combustion bed. The complete gas burnout then takes place in a downstream waste-gas burnout zone (compare 19 in FIG. 3) under secondary gas injection (compare 20 in FIG. 3).

Carbon concentration 12 in the combustion bed drops off continuously over the entire grate length, in particular, however, downstream of the aforementioned main combustion zone of the combustion bed, and asymptotically approaches 0. In actual systems, TOC contents (TOC: total organic carbon content) of approximately 1% are reached. The fixed carbon (residual carbon) is essentially burned out in a process that starts from fixed-bed burnout zone $P_3$. In this context, the temperatures measured in fixed-bed burnout zone $P_4$ drop significantly, which is attributable to the fact that the excess of inflow primary air in this fixed-bed burnout zone in comparison to the residual carbon content in the combustion bed leads to a high hyperstoichiometric ratio. Oxygen concentration 13 rises to approximately 18%.

This excess of primary gas in fixed-bed burnout zone $P_4$ effects a cooling of the combustion bed and thus reduces the burnoff rate of the fixed carbon. As a result, it prevents an efficient sintering of the ash and slag constituents, especially in this region, and is therefore undesirable. A throttling of the primary gas supply in this fixed-bed burnout zone is only marginally possible, since the local flow resistances are not uniformly distributed over the combustion bed surface due to the inhomogeneity, in particular the inhomogeneous distribution of the porosity of the slag-ash layer, which thereby promotes striation. The primary gas seeks the path of least resistance, thereby resulting in an inhomogeneous flow through the ash-slag layer (combustion bed). However, an efficient, homogeneous carbon burnout of the entire slag/ash regions requires a most homogeneous possible flow of oxygen-containing gas through the ash-slag layer at a high temperature.

Figure 3:
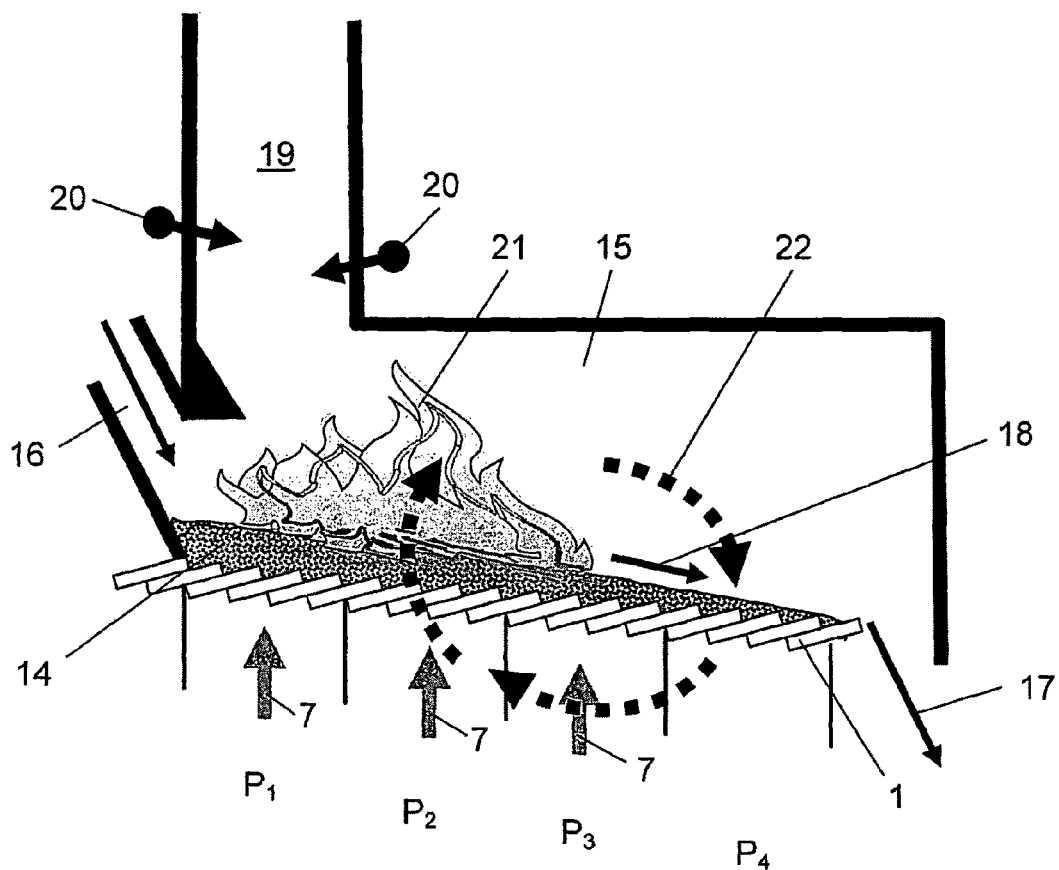
FIG. 3: shows a schematic representation of a two-stage incineration plant, including a schematically illustrated deflection of combustion-gas components through the last fixed-bed burnout zone.

As an approach for achieving the above objective, FIG. 3 shows a two-stage incineration plant of the type mentioned at the outset, however, including a schematically illustrated deflection of combustion-gas components through the last fixed-bed burnout zone. The plant is essentially composed of a combustion bed 14 on a combustion grate 1 in a combustion chamber 15 having an inlet 16 for fuel, an outlet 17 (compare fuel feed direction 18 in FIG. 1) for slag or other solid combustion products, as well as a waste-gas burnout zone 19 in the waste-gas flue downstream of the combustion chamber. Combustion chamber 15 covers all fixed-bed burnout zones $P_1$ through $P_4$ that are passed through in succession by the fuel in the combustion bed. Fixed-bed burnout zones $P_1$ through $P_3$ are traversed in each case via the combustion grate by the flow of an individual, oxygen-containing primary-gas supply 7 per fixed-bed burnout zone, while in an embodiment, no primary gas flows through the combustion bed in fixed-bed burnout zone $P_4$. An oxygen-containing secondary gas injection 20 takes place in downstream waste-gas burnout zone 19 in the waste-gas flue.

The location of combustion 21 of the solid fuel (shown only by a symbolic flame in FIG. 3) takes place primarily in the region of fixed-bed burnout zone $P_2$, in fixed-bed burnout zones $P_1$ through $P_4$, different combustion states naturally existing, which, in particular, are attributable to the combustion propagation and the temperature of the fuel (compare FIG. 2).

A good slag quality is characterized by low concentrations of residual carbon (TOC) and chloride, as well as of organic pollutants (for example, PCDD/F). This is ensured by a long enough slag residence time at high temperatures in the second half of the grate (in the example, fixed-bed burnout zones $P_3$ and $P_4$), most notably in last fixed-bed burnout zone $P_4$. In this context, however, combustion bed temperatures of above 1000° C., for example of greater than 1100° C. (the temperature of molten slag) should be avoided, since this can result in damage to or destruction of the grate.

The desired temperatures can be set in the combustion bed of the fixed-bed burnout zone $P_4$ by a feedback control of the through-flowing (i.e., induced) combustion gas volume or by alternating the intake operation (combustion gas through-flow) or primary gas supply (primary gas through-flow) over time (e.g., periodically).

A good sintering result can be achieved if a minimum temperature of 600° C. is set, as measured in the combustion grate of the last (or the aforementioned subsequent) fixed-bed burnout zone, given residence times of the combustion bed of longer than 10 minutes. The exceeding sintering temperature is typically at least at 60 to 70% of the molten slag temperature in ° C. The combustion bed temperature in fixed-bed burnout zone $P_4$ can be 800° C. to maximally 1000° C. at the surface of the slag layer, measured, for example, using a radiation pyrometer.

Long residence times of the slag during sintering in last fixed-bed burnout zone $P_4$ are set by low grate speeds. The resultant accumulating high slag layer exhibits a distinct temperature gradient due to poor mixing. When this fixed-bed burnout zone receives the incident flow of cold primary gas from below, the slag bed cools off considerably, and only a very minimal carbon burnout still takes place in this region.

The aforementioned temperature level between the sintering and melting temperature, for example between 800 and 1000° C., can be achieved by branching off combustion gases from the combustion chamber and, for example, by diverting the same over the shortest path possible, thereby allowing them to flow through the combustion bed on fixed-bed burnout zone $P_4$. In this context, the combustion gases can be branched off at a temperature level (compare FIG. 2, of, for example, approximately 900° C. temperature curve 10), i.e., in the region above fixed-bed burnout zone $P_2$ and $P_3$ and conveyed directly, for example, from above downwards through the combustion bed in fixed-bed burnout zone $P_4$. In this manner, the combustion bed can be completely traversed by the vertical flow, including the slag constituents, in fixed-bed burnout zone $P_4$, so that all of the slag constituents in the combustion bed are heated (compare FIG. 2, approximately 500-700° C., temperature curve 11) to a temperature above the sintering temperature, for example, above 800° C. The combustion gases flowing through combustion grate 1 in fixed-bed burnout zone $P_4$ can subsequently be fed to primary gas supply 7 or can again be fed to the combustion chamber above the combustion grate, thereby forming a recirculation circuit 22 for the hot combustion gases.

Since the recycled gas from $P_4$ still has a considerable oxygen content, the high calorific-value combustion gases from $P_2$ undergo a partial post-combustion. The result is a rise in the temperatures in the combustion chamber (compare FIG. 4a). In response to the ensuing higher temperature level of the combustion gases, the temperature in the combustion bed of fixed-bed burnout zone $P_4$ likewise increases.

The combustion gas or waste gas should have a sufficient quantity of oxygen for burning off the residual carbon of the combustion bed in fixed-bed burnout zone $P_4$.

The combustion gases can be recycled from above downwards through the combustion bed by a circulating means, for example an injector or a hot-gas blower, which can be configured as a suction device underneath combustion grate 1 in the last grate zone. In the process, the combustion gas advantageously loses a substantial portion of the heat to the combustion bed. Due to heat losses and the possible admixture of small quantities of cold gas (preferably air) underneath the combustion grate of zone 4, the more temperature-sensitive, movable system parts (combustion grate, circulating means) are protected. The exhausted quantity of combustion gas (or of waste gas including oxygen concentrations) is limited by the maximum permissible grate temperature (and aforementioned melting temperature of the slag). The $O_2$ and CO content in the waste gas underneath the combustion grate is measured. Ignitable mixtures (CO=12.5-74 vol. % in air, ignition temperature T=620° C.) are unlikely. When a minimum $O_2$ concentration (approximately 10 vol. %) is not met and a maximum CO concentration (approximately 1 vol. %) is exceeded, the primary air in upstream fixed-bed burnout zone $P_3$ can be increased.

Figure 4A:
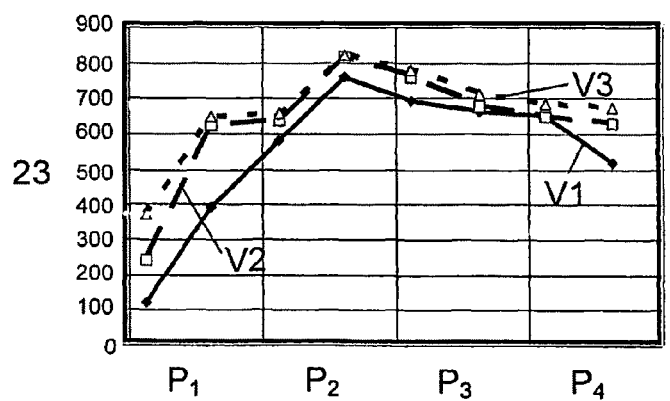
FIGS. 4a and b: show the grate temperatures and the flue-gas temperatures from various tests, plotted over the fixed-bed burnout zones.
Figure 4B:
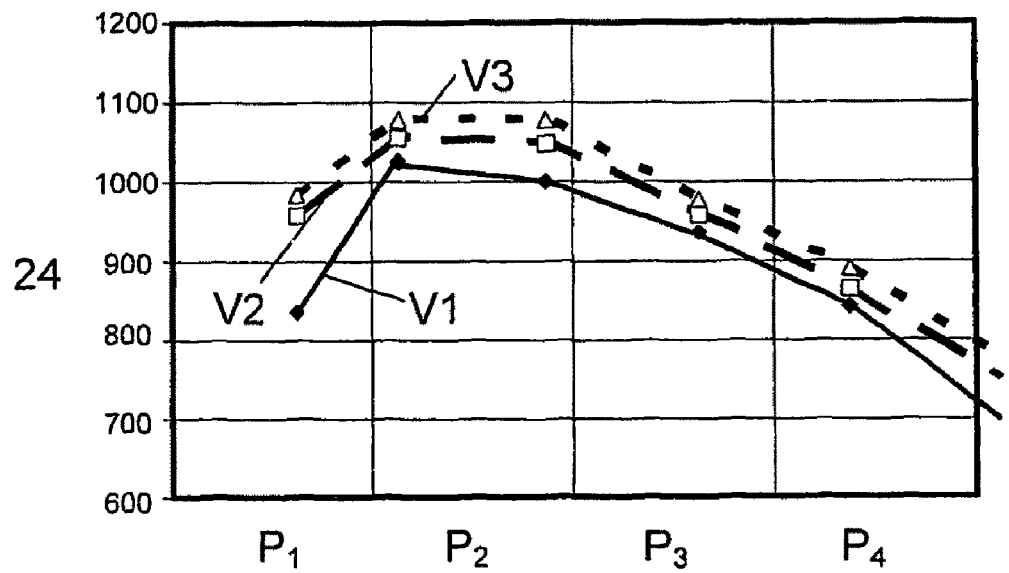
Figure 5A:
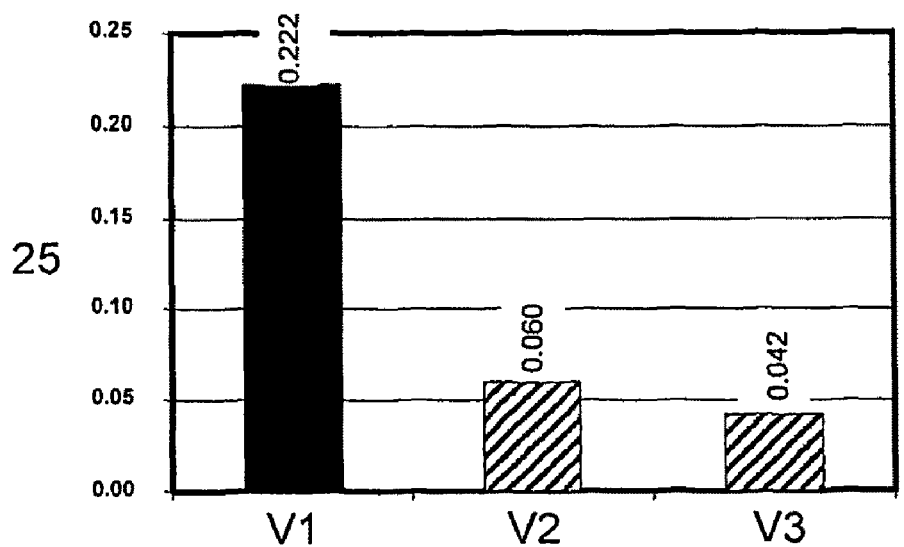
FIGS. 5a and b: shows the concentrations of unburned residual carbon and chloride in the slag for the tests represented in FIGS. 4a and b.
Figure 5B:
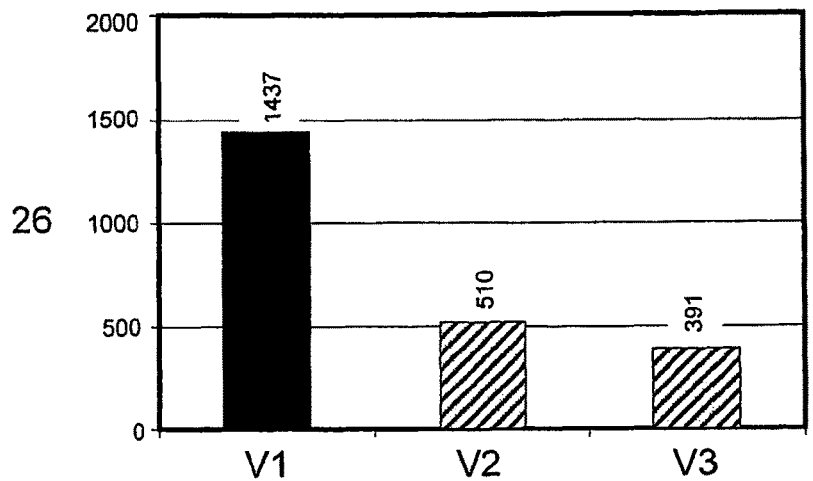

FIGS. 4a and b show grate temperatures 23 (FIG. 4a) and flue-gas temperatures 24 (combustion gas temperatures in the combustion chamber, FIG. 4b) ascertained in three tests (V1, V2, V3) in a refuse incineration plant (TAMARA of [Research Center] Forschungszentrum Karlsruhe) having grate firing over the aforementioned four fixed-bed burnout zones, plotted over the fixed-bed burnout zones. FIGS. 5a and b indicate TOC concentrations 25 in % (compare FIG. 5a) and chloride contents 26 in mg/kg (compare FIG. 5b) in the slag (dry sampling) over the aforementioned three tests. In this context, the recycled combustion gas can be exhausted by an injector through the combustion bed in the last fixed-bed burnout zone and is returned to the combustion chamber via fixed-bed burnout zone $P_2$.

Test V1 is used as a reference test without entailing any recycling of combustion gas in accordance with the present invention. In this context, fixed-bed burnout zones $P_1$ through $P_4$ were traversed by the flow of 50/00/1100/50 m³/h of primary gas. The fuel residence times set in individual fixed-bed burnout zones $P_1$ through $P_4$ via the grate drive were 300/300/600/1200 s.

Figure 6:
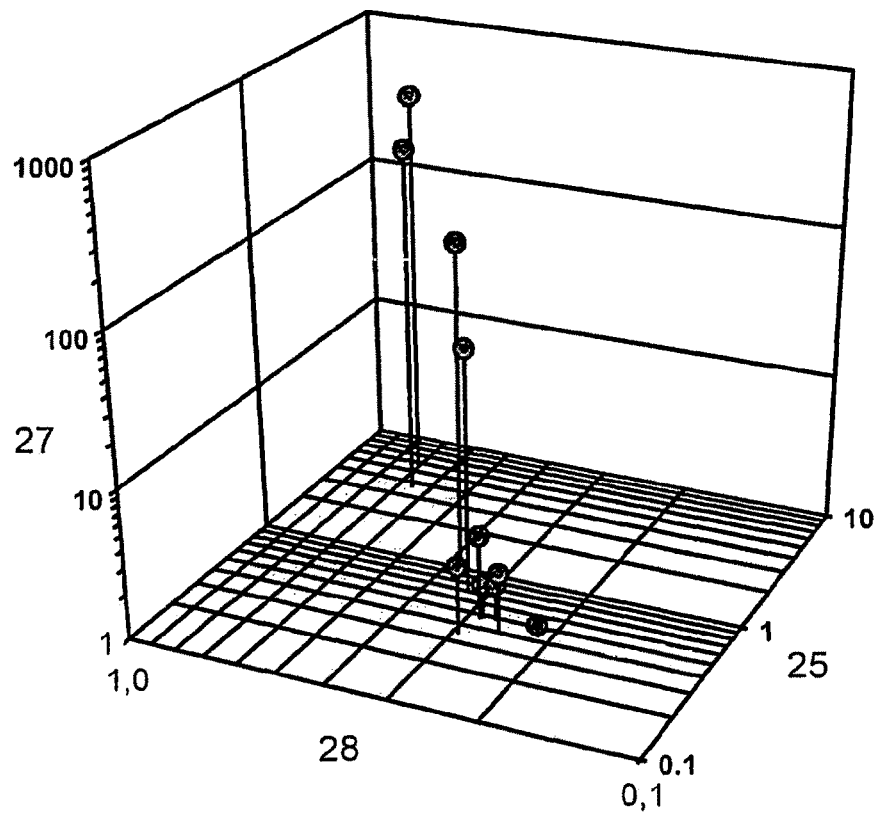
FIG. 6: shows the measured toxicity equivalents (TEq) of the slag obtained in the course of the tests in accordance with FIGS. 4 and 5.

On the other hand, tests V2 and V3 were carried out under the aforementioned exhaustion of combustion gas to be recycled (approximately 35 m³/h) from the top downwards through the combustion bed in fixed-bed burnout zone $P_4$. However, leakage in the primary gas supply led to a, even if reduced, primary gas supply of approximately 15 m³/h in fixed-bed burnout zone $P_4$, which has a cooling, i.e., favorable effect on the temperature underneath the combustion grate and on the exhaust means (injector), i.e., it protects the mechanical components located there. In comparison to V1, the temperatures measured in the exhausted flue gas underneath the combustion grate rise from 240 to 460° C. The aforementioned minimum $O_2$ concentration directly underneath the combustion grate of $P_4$ was approximately 17.8 vol.%, the maximum CO concentration, 0.12 vol.%. The axial temperature profiles in the combustion grate and in the waste gas above the combustion bed were increased at the grate end by approximately 100-150° C. (compare FIGS. 4a and b). Significant are the TOC concentrations (compare FIG. 5a) and chloride contents (compare FIG. 5b), which are reduced by factors of 4, respectively, 3, in comparison to V1, which advantageously leads to a low PCDD/F concentration in the slag. To this end, FIG. 6 shows the corresponding measured toxicity equivalents 27 in ng/kg (TEq) of the slag obtained in the course of the tests (chloride concentration (in %) 28 and TOC concentration (in %) 25).

No negative effects of the method on the combustion process or on the formation of pollutants could be ascertained. The production of $NO_X$ was even reduced by approximately 20%.

List of Reference Numerals
1 combustion grate
2 drying
3 degassing
4 burning off
5 sintering of the grate ash
6 grate length
7 primary gas supply
8 temperature curve (° C.)
9 concentration
10 temperature above the combustion bed
11 temperature directly on the grate surface
12 carbon burnoff (%)
13 oxygen concentration above the combustion bed
14 combustion bed
15 combustion chamber
16 inlet
17 outlet
18 fuel feed direction
19 waste-gas burnout zone
20 secondary gas injection
21 combustion
22 recirculation circuit
23 grate temperature (° C.)
24 flue-gas temperature (° C.)
25 TOC concentration (%)
26 chloride concentration in ppm
27 PCDD/F toxicity equivalent TEq (ng/kg)
28 chloride concentration in %

The invention claimed is:

1. A method for improving a slag quality of slag in a grate firing system, the method comprising:
providing a grate firing system including a combustion chamber disposed above a combustion bed, the combustion bed having a plurality of fixed-bed burnout zones in series on a combustion grate, the fixed-bed burnout zones including a first series of fixed-bed burnout zones and a second fixed bed burn-out zone disposed downstream of the first series;
traversing the first series of fixed-bed burnout zones with a flow of oxygen-containing gas; and
traversing, with a flow of a hot combustion gas from a region of the combustion chamber above the first series of fixed-bed burnout zones, a portion of the combustion bed associated with the second fixed bed burn-out zone from above and downwards through the portion of the combustion bed associated with the second fixed bed burn-out zone.

2. The method recited in claim 1, wherein the traversing with a flow of a hot combustion gas is performed in a continuous fashion.

3. The method recited in claim 1, wherein the traversing with a flow of a hot combustion gas is performed in an alternating fashion.

4. The method recited in claim 1, wherein the second fixed-bed burnout zone is the last downstream fixed-bed burnout zone of the plurality of fixed-bed burnout zones.

5. The method recited in claim 1, wherein no oxygen-containing gas is supplied to the second fixed-bed burnout zone.

6. The method recited in claim 1, wherein the traversing with a flow of a hot combustion gas is performed in a continuous fashion so as to avoid exceeding at least one of a maximum combustion-bed temperature and a maximum grate temperature.

7. The method recited in claim 1, wherein the traversing with a flow of a hot combustion gas is performed in an alternating fashion so as to avoid exceeding at least one of a maximum combustion-bed temperature and a maximum grate temperature.

8. The method recited in claim 1, further comprising recycling the traversed hot combustion gas in the combustion chamber above the combustion bed upstream from the second fixed-bed burnout zone.

9. The method recited in claim 1, further comprising admixing the traversed hot combustion gas with the flow of oxygen-containing gas to obtain a gas mixture, and then directing the gas mixture from below upwards through the combustion bed upstream from the second fixed-bed burnout zone.

10. The method recited in claim 9, further comprising determining at least one of an oxygen content, a carbon monoxide content and a temperature of the gas mixture underneath the portion of the combustion grate associated with the second fixed-bed burnout zone, and increasing a supply of the flow of oxygen-containing gas in at least one of the first series of fixed-bed burnout zones upstream from the second fixed-bed burnout zone if at least one of: a) a minimum oxygen concentration is not met, and b) a maximum carbon monoxide concentration is exceeded.

11. The method recited in claim 10, wherein the minimum oxygen concentration is 10 vol. % and the maximum carbon monoxide concentration is 1 vol. %.

12. The method recited in claim 1, wherein the traversing with a flow of a hot combustion gas is performed using suction.

13. The method recited in claim 1, further comprising providing an incident flow of cooling air underneath the combustion grate.

14. The method recited in claim 1, further comprising establishing a temperature of between 600° C. and a melting temperature of the slag in a region of the second fixed-bed burnout zone.

15. The method recited in claim 14, further comprising establishing a temperature of between 800° C. and 1000° C. on a surface of the combustion bed in the region of the second fixed-bed burnout zone.

16. The method recited in claim 14, further comprising measuring the temperature with a pyrometer.

17. The method recited in claim 1, wherein the improving the slag quality reduces at least one of the total organic content, chloride and organic pollutants of the slag.

* * * * *